United States Patent
Gilg et al.

(10) Patent No.: US 9,428,340 B2
(45) Date of Patent: Aug. 30, 2016

(54) CONVEYOR BELT WITH ZERO STAGE SPLICE

(71) Applicants: Douglas M. Gilg, Powell, OH (US); Robin B. Steven, Dublin, OH (US); Shannon G. Willer, Plain City, OH (US); David J. Maguire, Hudson, OH (US)

(72) Inventors: Douglas M. Gilg, Powell, OH (US); Robin B. Steven, Dublin, OH (US); Shannon G. Willer, Plain City, OH (US); David J. Maguire, Hudson, OH (US)

(73) Assignee: ContiTech Transport band systeme GMBH, Hannover (DE)

( * ) Notice: Subject to any disclaimer, the term of this patent is extended or adjusted under 35 U.S.C. 154(b) by 0 days.

(21) Appl. No.: 14/692,292

(22) Filed: Apr. 21, 2015

(65) Prior Publication Data

US 2015/0307281 A1 Oct. 29, 2015

Related U.S. Application Data

(60) Provisional application No. 61/982,995, filed on Apr. 23, 2014.

(51) Int. Cl.

| | |
|---|---|
| *B65G 17/06* | (2006.01) |
| *F16G 3/10* | (2006.01) |
| *B65G 15/36* | (2006.01) |
| *B23K 1/00* | (2006.01) |
| *B23K 35/30* | (2006.01) |
| *C22C 19/03* | (2006.01) |
| *B23K 1/002* | (2006.01) |
| *B23K 1/19* | (2006.01) |
| *B29D 29/06* | (2006.01) |

(52) U.S. Cl.
CPC .............. *B65G 15/36* (2013.01); *B23K 1/002* (2013.01); *B23K 1/0008* (2013.01); *B23K 1/19* (2013.01); *B23K 35/3033* (2013.01); *B29D 29/06* (2013.01); *C22C 19/03* (2013.01); *B23K 2201/30* (2013.01); *B23K 2203/04* (2013.01); *B23K 2203/16* (2013.01)

(58) Field of Classification Search
CPC ................................ B65G 17/06; F16G 3/10
USPC .............. 198/844.2, 847, 848; 474/253, 254, 474/255, 256; 24/38
See application file for complete search history.

(56) References Cited

U.S. PATENT DOCUMENTS

| | | | | |
|---|---|---|---|---|
| 3,853,526 A | * | 12/1974 | Hochart | C03B 35/165 193/35 B |
| 4,030,595 A | * | 6/1977 | McCombie | A24C 5/35 198/347.3 |
| 4,099,608 A | * | 7/1978 | McCombie | A24C 5/35 198/347.3 |
| 4,411,724 A | | 10/1983 | Ito et al. | 156/304.1 |
| 4,671,834 A | | 6/1987 | Price | 156/87 |
| 4,703,845 A | * | 11/1987 | Veenhof | B65G 45/12 15/256.5 |

(Continued)

*Primary Examiner* — Douglas Hess
(74) *Attorney, Agent, or Firm* — Alvin T. Rockhill

(57) ABSTRACT

The present invention is based upon the discovery that the steel cords in conveyor belt splices can be brazed together in a specific and cost effective manner to attain splices which having improved strength and durability. The present invention more specifically discloses a conveyor belt which is reinforced with steel cables and which includes a first section and a second section which are bonded together with a splice, wherein said splice bonds a first set of steel cables from the first section of the conveyor belt to a second set of steel cables from the second section of the conveyor belt with a braze alloy, and wherein the first set of steel cables and the second set of steel cables are contained within a ferrule at the point of where the first set of steel cables are bonded to the second set of steel cables.

20 Claims, 1 Drawing Sheet

(56) References Cited

U.S. PATENT DOCUMENTS

| | | | |
|---|---|---|---|
| 5,186,312 A * | 2/1993 | Ambs | B65G 19/14 198/716 |
| 5,348,143 A * | 9/1994 | Musil | B65G 15/30 198/844.2 |
| 5,377,818 A | 1/1995 | White | 198/844.2 |
| 5,632,701 A * | 5/1997 | Neel | B65G 17/08 24/33 B |
| 6,102,196 A | 8/2000 | Domit | 198/848 |
| 6,353,976 B1 * | 3/2002 | Sutherland | D21F 1/0054 24/33 P |
| 6,516,943 B2 | 2/2003 | Engle et al. | 198/844.2 |
| 7,261,929 B2 * | 8/2007 | Allen | B29C 66/8322 198/844.2 |
| 7,703,600 B1 * | 4/2010 | Price | B65G 15/34 198/844.1 |
| 7,721,877 B2 | 5/2010 | Maine, Jr. et al. | 198/848 |
| 8,151,432 B2 | 4/2012 | Daniels et al. | 29/525.01 |
| 8,453,320 B2 | 6/2013 | Swearingen et al. | 29/828 |
| 8,910,462 B2 | 12/2014 | DeSmet et al. | F16G 3/10 |
| 9,033,137 B2 | 5/2015 | Koppes et al. | B65G 15/32 |
| 2011/0132661 A1 * | 6/2011 | Harmason et al. | |

* cited by examiner

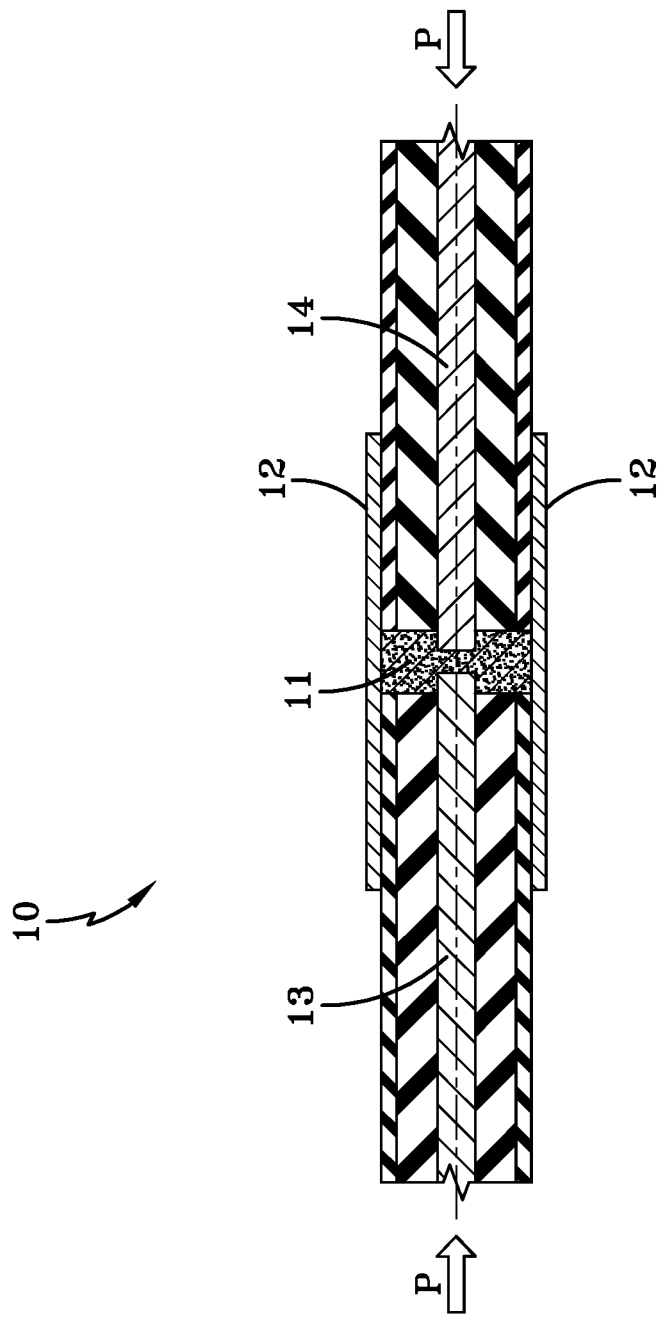

CONVEYOR BELT WITH ZERO STAGE SPLICE

The benefit of U.S. Provisional Patent Application Ser. No. 61/982,995, filed on Apr. 23, 2014, is claimed hereby. The teachings of U.S. Provisional Patent Application Ser. No. 61/982,995 are incorporated herein by reference in their entirety.

FIELD OF THE INVENTION

The invention relates to conveyor belts having improved splices between various sections of the belts. In these conveyor belts steel cables reinforcements are brazed together in zero stage splices.

BACKGROUND OF THE INVENTION

In a multitude of commercial applications, it is common to employ conveyor belts for the purpose of transporting products and materials. Such conveyor belts can serve in applications which have minimal demands, moderate demands, or in applications which are extremely demanding and which require heavy-duty conveyor belts. Conveyor belts can also very greatly in size and length. For instance, the conveyor belts used in mining applications can be very wide, for instance ten feet wide, and very long, for example, on the order of many miles. They can also be up to about three inches thick or even thicker. In any case, heavy-duty conveyor belts are widely used for moving minerals, coal, and a wide variety of manufactured products from one point to another. For instance, heavy-duty conveyor belts are often used in typical mining applications to transport minerals below the ground, to above the surface, and ultimately above ground to a desired location for processing and/or ultimately for transportation on rail road cars, trucks, barges, or ships.

Conventional conveyor belts which are used in heavy duty applications are typically comprised of a cured rubber as a top layer (the carry cover layer), a cured rubber as a bottom layer (the pulley cover layer), and a steel reinforcement layer which is situated between the top layer and the bottom layer. The prominent material used in such conveyor belts generally is a moderately flexible elastomeric or rubber-like material, and the belt is typically reinforced by a plurality of longitudinally extending steel cables or cords which are positioned within the belt and extend along the length thereof.

All conveyor belts are, of course, susceptible to normal wear and tear as well as damage from the material being transported and/or harsh environmental conditions. Over the years, substantial improvements have been made in the wear resistance of the rubber used as the cover carry layer of the conveyor belts and the useful service life of conveyor belts has been extended. However, splices between various sections of a conveyor belts is an area where it would be desirable to attain further improvement in durability and strength. To achieve improved splice strength and reliability multiple stage splices are frequently utilized to accomplish these objectives. In fact, multiple stages splices are typically utilized in heavy duty conveyor belts. However, conveyor belts splices continue to be a problem area which can limit the reliability and service life of the belt. There is accordingly a continuing long felt need to improve the durability and strength of the splices of conveyor belts. Achieving this objecting in a cost effective manner has been allusive, but continues to be needed today.

SUMMARY OF THE INVENTION

The present invention is based upon the discovery that the steel cords in conveyor belt splices can be brazed together in a specific and cost effective manner to attain splices which having improved strength and durability. Since spices between various sections of conveyor belts are frequently the weakest area of the conveyor belt this improvement in spice strength allows for belts having lower ST ratings to be utilized to meet needed performance requirements. For instance, end-to-end splices in commercial conveyor belts currently have a dynamic splice efficiency which is typically within the range of 50% to about 55%. However, conveyor belts which are manufactures utilizing the slices of this invention exhibit a dynamic splice efficiency of greater than 75% or even 80%. In any case, the splices of this invention are stronger and more durable than those in conveyor belts which are manufactured utilizing conventional spice technology. This can accordingly lead to improvements in the service life of conveyor belts made utilizing this technology as well as improved conveyor belt reliability. By eliminating the need for multiple stage splices cost savings can also be realized.

The present invention more specifically discloses a conveyor belt which is reinforced with steel cables and which includes a first section and a second section which are bonded together with a splice, wherein said splice bonds a first set of steel cables from the first section of the conveyor belt to a second set of steel cables from the second section of the conveyor belt with a braze alloy, and wherein the first set of steel cables and the second set of steel cables are contained within a ferrule at the point of where the first set of steel cables are bonded to the second set of steel cables.

The subject invention further reveals a method for connecting a steel cable in a splice between a first segment of a conveyor belt and a second segment of the conveyor belt, said method comprising: (a) inserting a brazing alloy into a metal ferrule, (b) inserting a first steel cable from the first segment of the conveyor belt into a first end to the steel ferrule and inserting a second steel cable from the second segment of the conveyor belt into a second end to the metal ferrule, (c) heating the brazing alloy to a temperature which is above the melting point of the brazing alloy, (d) applying pressure to the first steel cable and/or the second steel cable to embed the first steel cable and the second steel cable into the brazing alloy, and (e) allowing the brazing alloy to cool to ambient temperature to braze the first steel cable to the second steel cable.

BRIEF DESCRIPTION OF THE DRAWINGS

FIG. 1 is an illustration of a splice in accordance with this invention wherein the braze alloy is sandwiched in a ferrule between a first steel cable from the first segment of the conveyor belt and a second steel cable from a second segment of the conveyor belt.

DETAILED DESCRIPTION OF THE INVENTION

In practicing the method of this invention steel cables from joining sections (segments) of a conveyor belt are brazed together in the splices between two or more sections of the belt. The method of this invention can be employed in connecting steel cables which are comprised of virtually any type of steel and which have virtually any type of cable construction. However, in most cases it is preferable for the steel cables to be galvanized or to be brass plated.

In splicing the steel cables together a brazing alloy is inserted into a ferrule. The ferrule is typically a metal tube having a diameter which is only slightly larger than the diameter of the steel cables. The ferrule can be comprised of a wide variety of metals with steel, such as standard carbon steel or high carbon steel, typically being preferred. In some applications, utilizing a ferrule which is comprised of stainless steel is advantageous.

The braze alloy is typically comprised of at least about 70 weight percent nickel and is commonly comprised of at least 80 weight percent nickel. The braze alloy is can be further comprised of at least one element selected from the group consisting of zinc, boron, phosphorus, silicon and carbon. For example, the braze alloy can contain about 84 weight percent to about 94 weight percent nickel and from about 6 weight percent to about 16 weight percent phosphorus. It is typically for the braze alloy to contain about 86 weight percent to about 92 weight percent nickel and from about 8 weight percent to about 14 weight percent phosphorus. In many cases it is preferred for the braze alloy to be comprised of about 88 weight percent to about 92 weight percent nickel and from about 8 weight percent to about 12 weight percent phosphorus. In any case, the brazing alloy will typically have a melting point which is within the range of 625° C. to about 975° C. The brazing alloy will more typically have a melting point which is within the range of 700° C. to about 950° C. The brazing alloy will preferably have melting point which is within the range of 800° C. to about 925° C. and will more preferably have melting point which is within the range of 850° C. to about 900° C.

It is typically preferred to introduce the brazing alloy into the ferrule in the form of slugs. Such slugs can be made by mixing the brazing alloy into a standard brazing powder and compressing the composition into slugs of the desired size for handling and insertion into the ferrule.

In any case, the brazing alloy can introduced into the ferrule with the two ends of the steel cables being spliced together being inserted into the ferrule subsequently. However, it is typically more convenient to insert the end of a steel cable from one side of the splice into the ferrule and then to subsequently insert the brazing alloy into the opposite end of the ferrule followed by insertion of the steel cable from the other side of the splice into that end of the ferrule. In any case, the braze alloy and the two ends of the steel cables being brazed together in the splice are configured as illustrated in FIG. 1.

FIG. 1 is an illustration of a splice 10 in accordance with this invention wherein the braze alloy 11 is sandwiched in a ferrule 12 between a first steel cable 13 from the first segment of the conveyor belt and a second steel cable 14 from a second segment of the conveyor belt. As illustrated in FIG. 1, the braze alloy 11 is sandwiched between a first steel cable 13 from the first segment of the conveyor belt and a second steel cable 14 from a second segment of the conveyor belt. In any case, the braze alloy 11, the end of the first steel cable 13 and the end of the second steel cable 14 are all contained within the ferrule 12 after the end of the second steel cable is inserted into the ferrule.

The ferrule is heated to a temperature which is above the melting point of the brazing alloy after the brazing alloy and the two steel cables being joined are inserted therein. This is done by heating the ferrule by any appropriate means, such as by electrical induction heating or with a torch. In any case, heat is applied to the braze alloy by conduction heating through the ferrule which is carried out in a manner that prevents overheating of the steel cables which can cause the formation of martensitic structure in the steel cables and an associated deterioration of physical properties. In any case, care should be taken to prevent the steel cables from being exposed to a heating cycle which causes the formation of martensitic structure. Pressure is applied to push the first steel cable and/or the second steel cable together into the molten brazing alloy so as to displace the braze alloy and so as to substantially fill interstices between the steel cable with the braze alloy. In other words, the two ends of the steel cables should be snugly pushed together to fill any air pockets which may exist between filaments of the steel cables and the area between the ends of the two steel cables.

After the steel cables are snugly pushed together and embedded in the molten brazing alloy the ferrule is allowed to cool to ambient temperature which causes the braze alloy to solidify in a manner that bonds the steel cables together. This method of affixing multiple steel cables together allows for a zero stage splice without compromising the strength of durability of the splice. In fact, such splices offer improved strength and durability as compared to the levels which can be achieved via multistage splices which utilized conventional technology. In any case, after the steel cables are bonded together the splice can be completed using conventional methods and materials for affixing the elastomeric layers of the conveyor belt together at the point of the splice. For instance, the carry cover layer and the pulley cover layers of the conveyor belt can be bonded together utilizing conventional splicing procedures.

While certain representative embodiments and details have been shown for the purpose of illustrating the subject invention, it will be apparent to those skilled in this art that various changes and modifications can be made therein without departing from the scope of the subject invention.

What is claimed is:

1. A conveyor belt which is comprised of a carry cover layer, pulley cover layer, and a reinforcement ent er which is situated between the carry cover layer and the pulley cover layer, wherein the reinforcement layer is reinforced with steel cables, wherein the conveyor belt includes a first section and a second section which are bonded together with a splice, wherein said splice bonds a first set of steel cables from the first section of the conveyor belt to a second set of steel cables from the second section of the conveyor belt with a braze alloy, and wherein the first set of steel cables and the second set of steel cables are contained within a ferrule at the point of where the first set of steel cables are bonded to the second set of steel cables in the reinforcement layer of the conveyor belt.

2. The conveyor belt as specified in claim 1 wherein the steel cables are galvanized.

3. The conveyor belt as specified in claim 1 wherein the ferrule is comprised of steel.

4. The conveyor belt as specified in claim 1 wherein the first section of the conveyor belt is connected to the second section of the conveyor belt via zero stage splices.

5. The conveyor belt as specified in claim 1 wherein the braze alloy is comprised of at least about 70 weight percent nickel and at least one element selected from the group consisting of zinc, boron, phosphorus, silicon and carbon.

6. The conveyor belt as specified in claim 1 wherein the braze alloy is comprised of about 84 weight percent to about 94 weight percent nickel and from about 6 weight percent to about 16 weight percent phosphorus.

7. The conveyor belt as specified in claim 1 wherein the braze alloy is comprised of about 88 weight percent to about 92 weight percent nickel and from about 8 weight percent to about 12 weight percent phosphorus.

8. The conveyor belt as specified in claim 1 wherein the brazing alloy has a melting point which is within the range of 625° C. to about 975° C.

9. The conveyor belt as specified in claim 1 wherein the brazing alloy has a melting point which is within the range of 850° C. to about 900° C.

10. A method for connecting a steel cable in a splice between a first segment of a conveyor belt and a second segment of the conveyor belt, said method comprising: (a) inserting a brazing alloy into a metal ferrule, (b) inserting a first steel cable from the first segment of the conveyor belt into a first end to the steel ferrule and inserting a second steel cable from the second segment of the conveyor belt into a second end to the metal ferrule, (c) heating the brazing alloy to a temperature which is above the melting point of the brazing alloy, (d) applying pressure to the first steel cable and/or the second steel cable to embed the first steel cable and the second steel cable into the brazing alloy, and (e) allowing the brazing alloy to cool to ambient temperature to braze the first steel cable to the second steel cable.

11. The method as specified in claim 10 wherein the pressure is applied in step (d) by bringing the first steel cable and/or the second steel cable together into the brazing alloy so as to displace the braze alloy and so as to substantially fill interstices between the steel cable with the braze alloy.

12. The method as specified in claim 11 wherein the brazing alloy is inserted into the steel ferrule in the form of a powder.

13. The method as specified in claim 11 wherein the brazing alloy is inserted into the steel ferrule in the form of slugs, and wherein the slugs are comprised of the brazing alloy and a brazing powder binder.

14. The method as specified in claim 11 wherein the ferrule has an inside diameter which is only slightly greater in size than the diameter of the first steel cable and the second steel cable.

15. The method of claim 11 wherein the brazing alloy has a melting point which is within the range of 625° C. to about 975° C.

16. The method of claim 11 wherein the heat is applied in step (c) to the braze alloy by conduction heating through the ferrule.

17. The method of claim 16 wherein the first section of the conveyor belt is connected to the second section of the conveyor belt via zero stage splices.

18. The method of claim 16 wherein the braze alloy is comprised of at least about 70 weight percent nickel and at least one element selected from the group consisting of zinc, boron, phosphorus, silicon and carbon.

19. The method of claim 18 wherein the braze alloy is comprised of about 84 weight percent to about 94 weight percent nickel and from about 6 weight percent to about 16 weight percent phosphorus.

20. The method of claim 18 wherein the braze alloy is comprised of about 88 weight percent to about 92 weight percent nickel and from about 8 weight percent to about 12 weight percent phosphorus.

* * * * *